(12) United States Patent
Sugiura et al.

(10) Patent No.: US 9,035,596 B2
(45) Date of Patent: May 19, 2015

(54) WEARABLE BATTERY DEVICE WITH TETHERED CONNECTING ADAPTER FOR POWER TOOL

(75) Inventors: Yuichi Sugiura, Anjo (JP); Hideki Abe, Anjo (JP); Tomohiro Hachisuka, Anjo (JP); Yukihiko Yamada, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 943 days.

(21) Appl. No.: 13/213,526

(22) Filed: Aug. 19, 2011

(65) Prior Publication Data

US 2012/0052356 A1    Mar. 1, 2012

(30) Foreign Application Priority Data

Aug. 25, 2010    (JP) .................................. 2010-188028

(51) Int. Cl.
*H02J 7/00* (2006.01)
*H01M 2/10* (2006.01)
*B25F 5/00* (2006.01)

(52) U.S. Cl.
CPC ............... *H01M 2/1016* (2013.01); *B25F 5/00* (2013.01); *H01M 2/1005* (2013.01)

(58) Field of Classification Search
CPC .............................. H02J 7/0042; H02J 7/0044
USPC ................................... 320/107, 113, 115, 112
See application file for complete search history.

(56) References Cited

U.S. PATENT DOCUMENTS

| | | | |
|---|---|---|---|
| 1,935,790 A | 11/1933 | Dame | |
| 5,633,096 A | 5/1997 | Hattori | |
| 6,172,860 B1 * | 1/2001 | Yoshimizu et al. | 361/25 |
| 6,683,439 B2 * | 1/2004 | Takano et al. | 320/132 |
| 7,629,766 B2 * | 12/2009 | Sadow | 320/111 |
| 8,813,866 B2 * | 8/2014 | Suzuki | 173/2 |

(Continued)

FOREIGN PATENT DOCUMENTS

| | | |
|---|---|---|
| CA | 2 347 139 A1 | 11/2002 |
| JP | A-62-148169 | 7/1987 |

(Continued)

OTHER PUBLICATIONS

May 24, 2013 Extended European Search Report issued in European Patent Application No. EP 11 17 8093.8.

(Continued)

*Primary Examiner* — Richard V Muralidar
(74) *Attorney, Agent, or Firm* — Oliff PLC

(57) ABSTRACT

A battery device that functions as a power source of a tool main body and is attachable to a body of a user may include a battery housing that is capable of removably receiving at least one rechargeable battery and capable of being electrically connected to the at least one battery, an adaptor that is capable of being electrically connected to the tool main body, and a cable electrically connecting the battery housing and the adaptor. The battery housing comprises a housing body that is constructed to be attached to the body of the user and is capable of receiving the at least one battery therein, and a cover member that is openably and closably attached to the housing body. The housing body and the at least one battery are connected to each other via a male-female engagement device. The male-female engagement device has an engagement release portion that is positioned so as to be exposed when the cover member is opened relative to the housing body.

14 Claims, 13 Drawing Sheets

(56) References Cited

U.S. PATENT DOCUMENTS

2008/0083079 A1 4/2008 Starrette
2011/0279090 A1* 11/2011 Bauer .......................... 320/137
2013/0025893 A1* 1/2013 Ota et al. ......................... 173/2

FOREIGN PATENT DOCUMENTS

| JP | A-63-207049 | 8/1988 |
|---|---|---|
| JP | U-3-62783 | 6/1991 |
| JP | A-8-7860 | 1/1996 |
| JP | A-8-195191 | 7/1996 |
| JP | B-3142460 | 12/2000 |
| JP | U-3077857 | 6/2001 |
| JP | A-2009-39841 | 2/2009 |

OTHER PUBLICATIONS

Dec. 24, 2013 Office Action issued in Japanese Patent Application No. 2010-188028 (with translation).
Mar. 25, 2014 Office Action issued in Japanese Patent Application No. 2010-188028 (with translation).

* cited by examiner

WEARABLE BATTERY DEVICE WITH TETHERED CONNECTING ADAPTER FOR POWER TOOL

BACKGROUND OF THE INVENTION

1. Field of the Invention

The present invention relates to battery devices as power sources of gardening power tools (electrical power tools). More particularly, the present invention relates to battery devices that are capable of being attached to bodies of users of gardening power tools.

2. Description of Related Art

A gardening power tool such as an electrical hedge trimmer is generally known. Such a gardening power tool can be powered by a rechargeable power source. An example of the rechargeable power source is a battery device that is capable of being separated from the gardening power tool. Such a battery device is taught, for example, by Japanese Laid-Open Patent Publication Number 8-7860. The battery device is capable of being separated from the gardening power tool and being attached or strapped to a body of a user of the gardening power tool (a worker). Therefore, the gardening power tool may have increased usability.

The battery device is constructed of a housing and a general-purpose rechargeable battery such as a lithium ion battery. The rechargeable battery is detachably disposed in the housing. Therefore, when the rechargeable battery is weakened or run out, it can be replaced with a new one. Further, the housing has a lid or cover in order to prevent water and dust from entering the housing.

Generally, the rechargeable battery can be weakened or run out during use of the gardening power tool. Therefore, it is essential that the rechargeable battery can be easily and quickly replaced with the new one while the battery device is attached or strapped to the user's body (i.e., without detaching the battery device from the user's body). Thus, there is a need in the art for an improved battery device.

BRIEF SUMMARY OF THE INVENTION

In one aspect of the present invention, a battery device that functions as a power source of a tool main body and is attachable to a body of a user may include a battery housing that is capable of removably receiving at least one rechargeable battery and capable of being electrically connected to the at least one battery, an adaptor that is capable of being electrically connected to the tool main body, and a cable electrically connecting the battery housing and the adaptor. The battery housing comprises a housing body that is constructed to be attached to the body of the user and is capable of receiving the at least one battery therein, and a cover member that is openably and closably attached to the housing body. The housing body and the at least one battery are connected to each other via a male-female engagement device. The male-female engagement device has an engagement release portion that is positioned so as to be exposed when the cover member is opened relative to the housing body.

According to this aspect, because the housing body is constructed to be attached to the body of the user, the battery device can be attached to the body of the user. The housing body is capable of removably receiving at least one battery and is capable of being electrically connected to the battery. Therefore, the battery housing (the housing body) can receive at least one general-purpose rechargeable battery. Further, the battery housing is constructed of the housing body and the cover member that is openably and closably attached to the housing body. Therefore, the battery housing can be effectively sealed by the cover member, so that water (raindrops) can be prevented from entering the battery housing.

Further, when the cover member is opened relative to the housing body while the battery housing is attached to the body of the user, the engagement release portion can be exposed. Therefore, the user can easily and quickly manipulate the engagement release portion. Thus, the battery can be easily and quickly replaced with new one.

Optionally, the housing body may be arranged and constructed such that the at least one battery can be inserted thereinto from above when the housing body is attached to the body of the user. Further, the engagement release portion can be exposed upwardly on the upper side of the housing body when the cover member is opened.

Further, the housing body may include an inside wall that faces the body of the user, an outside wall that is positioned opposite to the inside wall, and side walls that respectively intersect with the inside wall and the outside wall. A removed portion may be formed in side walls and an outside wall of the housing body so as to be extended downwardly from upper peripheries thereof, so that the battery received in the housing body can be partially laterally exposed when the cover member is opened.

Other objects, features and advantages of the present invention will be readily understood after reading the following detailed description together with the accompanying drawings and the claims.

DETAILED DESCRIPTION OF THE INVENTION

A representative embodiment of the present invention will now be described in detail with reference to FIGS. 1 to 14.

In this embodiment, a hedge trimmer, is exemplified as a gardening power tool 10 (an electrical power tool). As will be recognized, the hedge trimmer is a device that is constructed to trim or cut garden trees.

Figure 1:
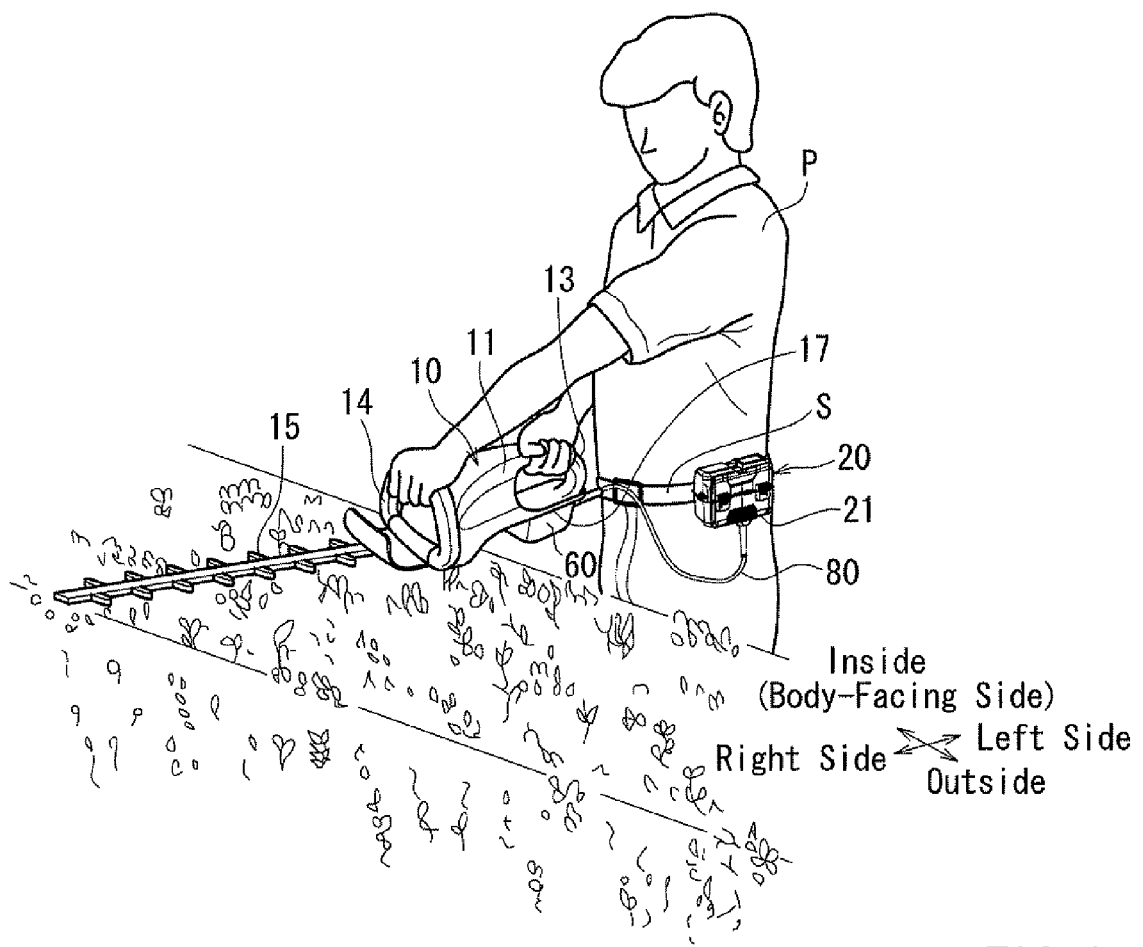
FIG. 1 is a schematic view of a gardening power tool with a battery device according to a representative embodiment of the present invention, in which the gardening power tool is used while the battery device is attached to a user.
Figure 2:
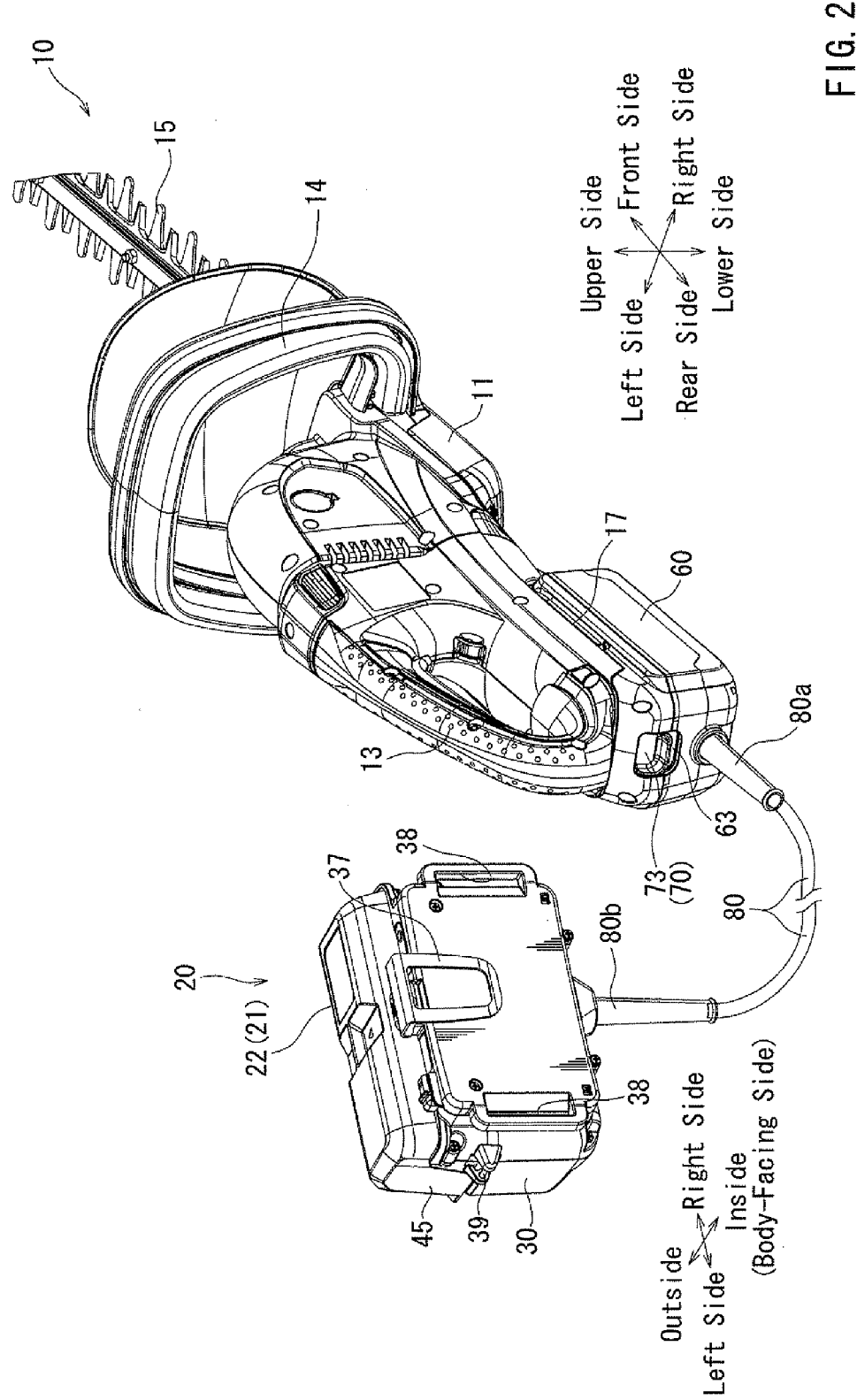
FIG. 2 is a perspective view of the gardening power tool with the battery device.

As shown in FIGS. 1 and 2, the gardening power tool 10 (the hedge trimmer) includes a tool main body 11 and a battery device 20 that functions as a power source of the tool main body 11. The tool main body 11 may preferably include a grip portion 13 that is formed in a rear end portion thereof, an additional grip portion 14 that is formed in a front end portion thereof, and a blade portion 15 that is projected forwardly from the front end portion. The blade portion 15 is arranged and constructed to be driven by a drive mechanism (not shown) disposed in the tool main body 11. Conversely, the battery device 20 includes a battery device main body 21 that contains at least one (two in this embodiment) general-purpose rechargeable battery B (FIG. 7), e.g., a lithium ion battery, for an electrical power tool and is electrically connected to the tool main body 11 via an adaptor 60 and a cable 80.

As shown in FIG. 2, the tool main body 11 may further include an adaptor connecting portion 17 (which may be referred to as a battery connecting portion) that is formed in a lower side thereof (a side opposite to the grip portion 13). The adaptor connecting portion 17 includes a female hook mechanism (not shown) and connector terminals (not shown), so as to be mechanically and electrically connected to a connector mechanism (which will be hereinafter described) of the adaptor 60.

Further, the adaptor connecting portion 17 (the female hook mechanism and the connector terminals) are capable of being connected to a connector mechanism of the battery B. That is, the connector mechanism of the adaptor 60 has the substantially same structure as the connector mechanism of the battery B.

As shown in FIG. 1, in order to use the gardening power tool 10 thus constructed, the battery device 20 is attached to a body (a waist belt S) of a user P. Thereafter, the tool main body 11 (the blade portion 15) is driven while the grip portions 13 and 14 are gripped by the user P, so as to trim or cut the garden trees.

Next, the battery device 20 will be described in detail. The battery device 20 is constructed to be attached to the user's body (FIG. 1). As previously described, the battery device 20 may preferably include the battery device main body 21, the adaptor 60, and the cable 80 electrically connecting the battery device main body 21 and the adaptor 60 (FIG. 2).

Before describing the battery devise main body 21, the adaptor 60 will be described. As will be recognized, the adaptor 60 may function to electrically connect the battery device main body 21 to the tool main body 11. Further, in the description, front side and rear side, right side and left side, and upper side and lower side of the adaptor 60 respectively correspond to front side and rear side, right side and left side, and upper side and lower side of the tool main body 11 when the adaptor 60 is attached to the tool main body 11.

Figure 3:
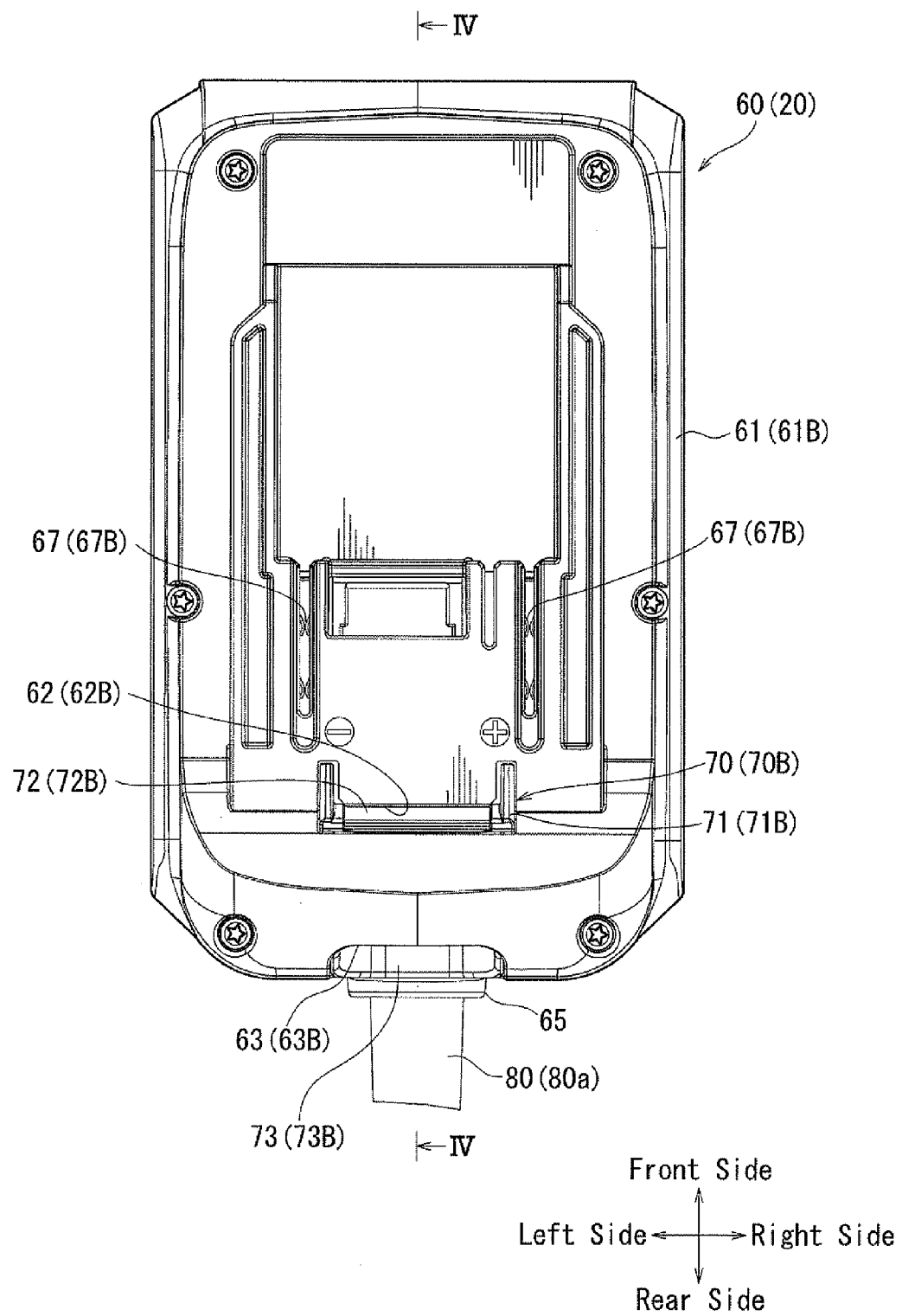
FIG. 3 is a side view of an adaptor capable of electrically connecting the battery device to the gardening power tool, which view is viewed from a connecting side (an upper side)

As shown in FIG. 3, the adaptor 60 is substantially constructed of a housing 61 and a cable connecting portion 65 that is formed in a rear wall of the housing 61. Further, the adaptor 60 includes a male hook mechanism 70 (an engagement device) and connector terminals 67 that constitute the connector mechanism of the adaptor 60. The male hook mechanism 70 and the connector terminals 67 are received in the housing 61. As will be recognized, the male hook mechanism 70 and the connector terminals 67 are arranged and constructed to be engageable with the female hook mechanism and the connector terminals of the adaptor connecting portion 17 of the tool main body 11. Further, as described above, the connector mechanism of the adaptor 60 has the substantially same structure as the connector mechanism of the battery B.

Figure 4:
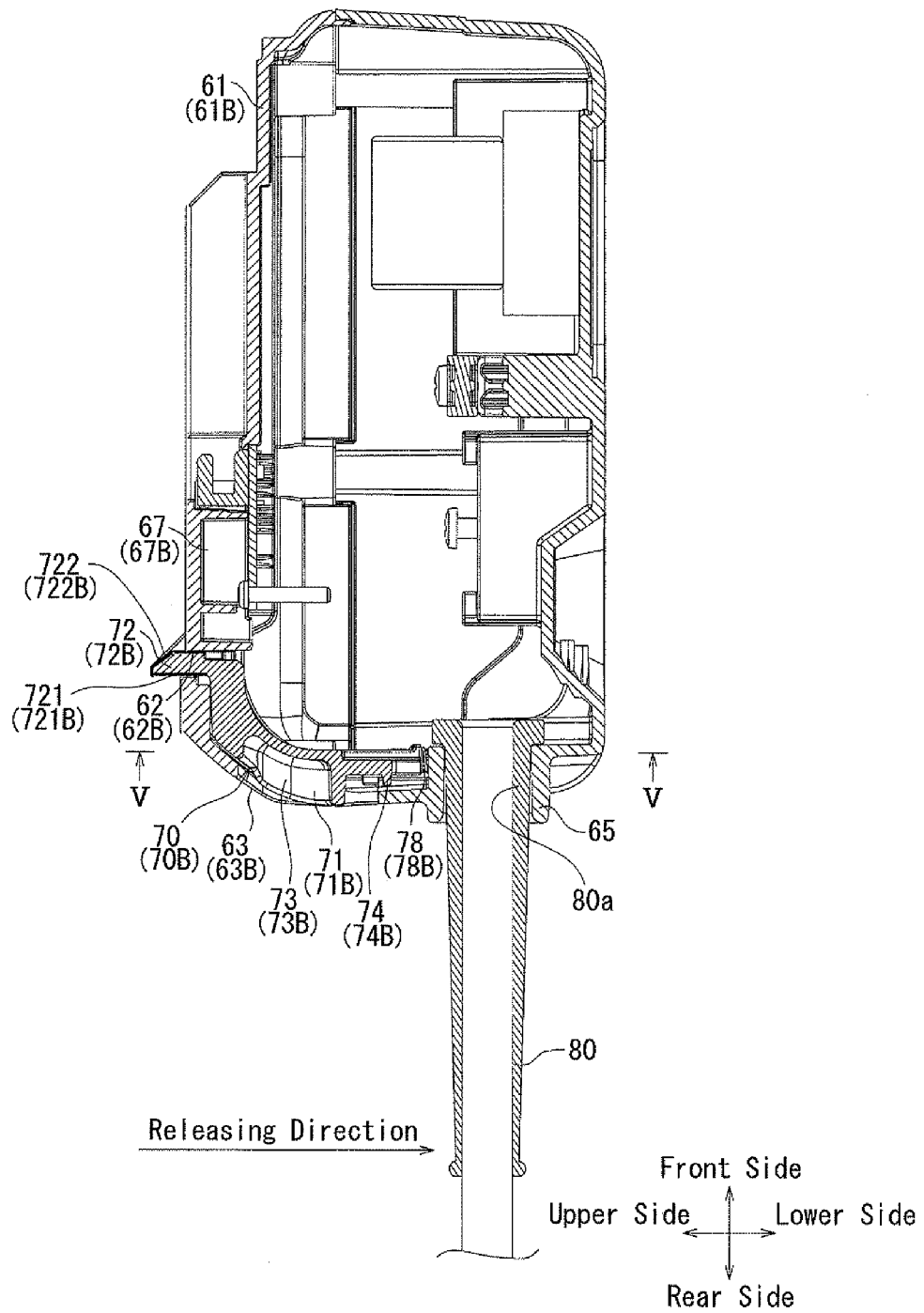
FIG. 4 is a cross-sectional view taken along line IV-IV of FIG. 3.

The housing 61 may preferably have the substantially same shape as the battery B and have a hollow cavity formed therein. As best shown in FIG. 4, the housing 61 is connected to a distal end 80a of the cable 80 via the cable connecting portion 65. The cable 80 (the distal end 80a) is electrically connected to the connector terminals 67 via an appropriate electric substrate that is received in the housing 61. The connector terminals 67 are positioned adjacent to an upper wall (a connecting side-wall) of the housing 61 and are arranged and constructed to be electrically connected to the connector terminals of the adaptor connecting portion 17 of the tool main body 11.

Figure 5:
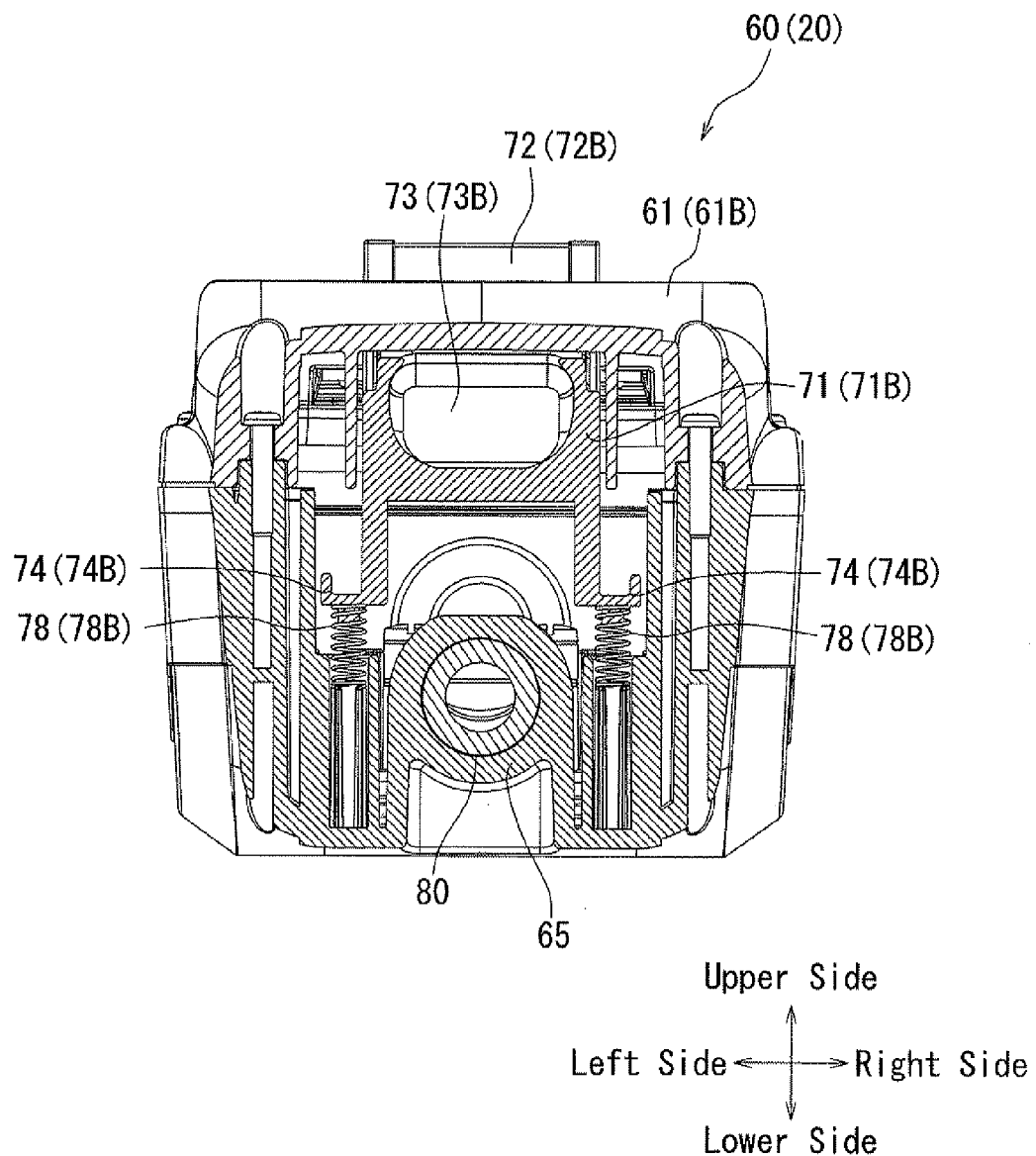
FIG. 5 is a cross-sectional view taken along line V-V of FIG. 4.

As shown in FIGS. 3 to 5, the male hook mechanism 70 may preferably include a male hook member 71 and a pair of biasing springs 78. As best shown in FIG. 4, the male hook member 71 is formed by integral molding of a resin and is shaped to have a curved portion. The male hook member 71 includes a male hook portion 72, an engagement release portion 73 and biasing spring receiving portions 74 and arcuately extends along the upper wall and the rear wall of the housing 61. Further, each of the biasing springs 78 is made of a coil spring.

As shown in FIG. 4, the male hook portion 72 is formed in a distal end portion of the male hook member 71 and generally has a hook shape. The male hook portion 72 is shaped to be projected upwardly beyond the upper wall of the adaptor housing 61. In particular, the male hook member 71 is disposed in the housing 61 such that the male hook portion 72 can be projected upwardly through a through hole 62 formed in the connecting side wall of the housing 61. The male hook portion 72 is arranged and constructed to engage a female hook portion (not shown) of the female hook mechanism of the adaptor connecting portion 17. Further, the male hook portion 72 may preferably have a vertical stopper portion 721. The stopper portion 721 is formed in a rear surface (a lower surface in FIG. 4) of the male hook portion 72, so as to be extended in a lateral direction, i.e., in a direction perpendicular to a longitudinal direction (in a front and back direction in FIG. 4). Further, the male hook portion 72 may preferably have a guide portion 722 that is formed in a projected (distal) end of the male hook portion 72. The guide portion 722 is inclined upwardly from a front surface (an upper surface in FIG. 4) of the male hook portion 72 toward the rear surface (the lower surface in FIG. 4) of the male hook portion 72.

As shown in FIGS. 3 to 5, the engagement release portion 73 may preferably be positioned in a substantially middle portion of the male hook member 71. The engagement release portion 73 is exposed to an exterior through the rear side wall of the adaptor housing 61. In particular, the male hook member 71 is positioned such that the engagement release portion 73 can be exposed to the exterior through a through opening 63 formed in the rear side wall of the housing 61. Further, the engagement release portion 73 may preferably be shaped such that the user P can easily manipulate the same in order to release or disengage the male hook portion 72 of the male hook member 71 from the female hook portion of the female hook mechanism of the adaptor connecting portion 17.

As best shown in FIGS. 4 and 5, the biasing spring receiving portions 74 are formed in a proximal end portion of the male hook member 71. Conversely, the biasing springs 78 are positioned between the biasing spring receiving portions 74 and the housing 61. Also, the biasing springs 78 are arranged and constructed to normally bias the male hook member 71 upwardly of the housing 61 (leftwardly in FIG. 4) such that the male hook portion 72 can be normally projected upwardly through the through hole 62.

In order to release or disengage the male hook portion 72 from the female hook portion of the female hook mechanism of the adaptor connecting portion 17, the engagement release portion 73 is manipulated by the user P so as to move the male hook member 71 downwardly of the housing 61 (rightwardly in FIG. 4) against spring forces of the biasing springs 78. As a result, the male hook member 71 moved downwardly while it is guided via the biasing spring receiving portions 74, so that the male hook portion 72 can be retracted into the housing 61 through the through hole 62. Thus, the male hook portion 72 can be disengaged from the female hook portion of the female hook mechanism of the adaptor connecting portion 17. In this condition, the male hook mechanism 70 and the connector terminals 67 of the adaptor 60 can be released from the female hook mechanism and the connector terminals of the adaptor connecting portion 17 of the tool main body 11.

Next, the battery devise main body 21 will be described with reference to FIGS. 6 to 10. Further, in the description, inside and outside, right side and left side, and upper side and lower side of the battery main body 21 respectively correspond to front side and rear side, right side and left side, and upper side and lower side viewed from the user P when the battery main body 21 is attached to the body of the user P using the waist belt S.

The battery main body 21 includes a battery housing 22 that is capable of receiving at least one battery B therein. The battery housing 22 is constructed to be capable of being attached to the body of the user P (FIG. 1). Further, as shown by thick broken lines in FIG. 7, in this embodiment, the battery housing 22 is constructed to receive two batteries B therein and is capable of being electrically connected thereto. As best shown in FIG. 8, the battery housing 22 is substantially constructed of a housing body 30 that is capable of receiving the batteries B therein and a cover member 45 that is openably and closably attached to the housing body 30.

Further, each of the batteries B received in the housing body 30 has the substantially same structure as the adaptor 60 except that each of the batteries 13 does not have an element corresponding to the cable connecting portion 65 of the adaptor 60, and instead, contains a battery cell C (FIG. 10) therein. Therefore, elements that are the substantially same as the adaptor 60 will be identified by similar reference numerals (i.e., the same reference numerals plus an uppercase character B) and a detailed description of each of the batteries B may be omitted. Further, the reference numerals identifying the elements of each of the batteries B are added to FIGS. 3 to 5 in parentheses, so as to clarify the correspondence relation of the elements of the adaptor 60 and the elements of each of the batteries B.

Figure 8:
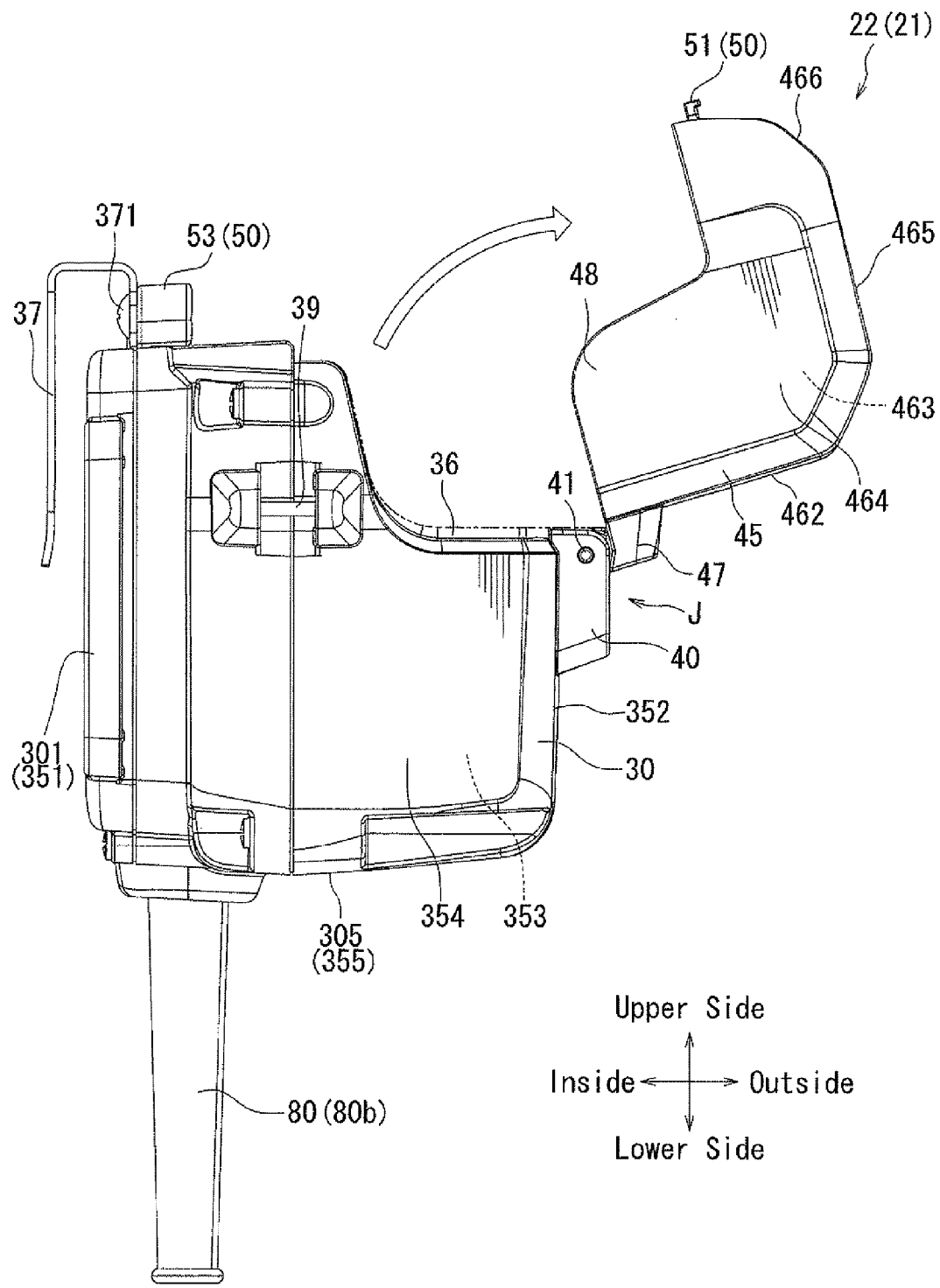
FIG. 8 is a side view of the battery housing of the battery device, which view illustrates a condition in which a cover member is opened.
Figure 9:
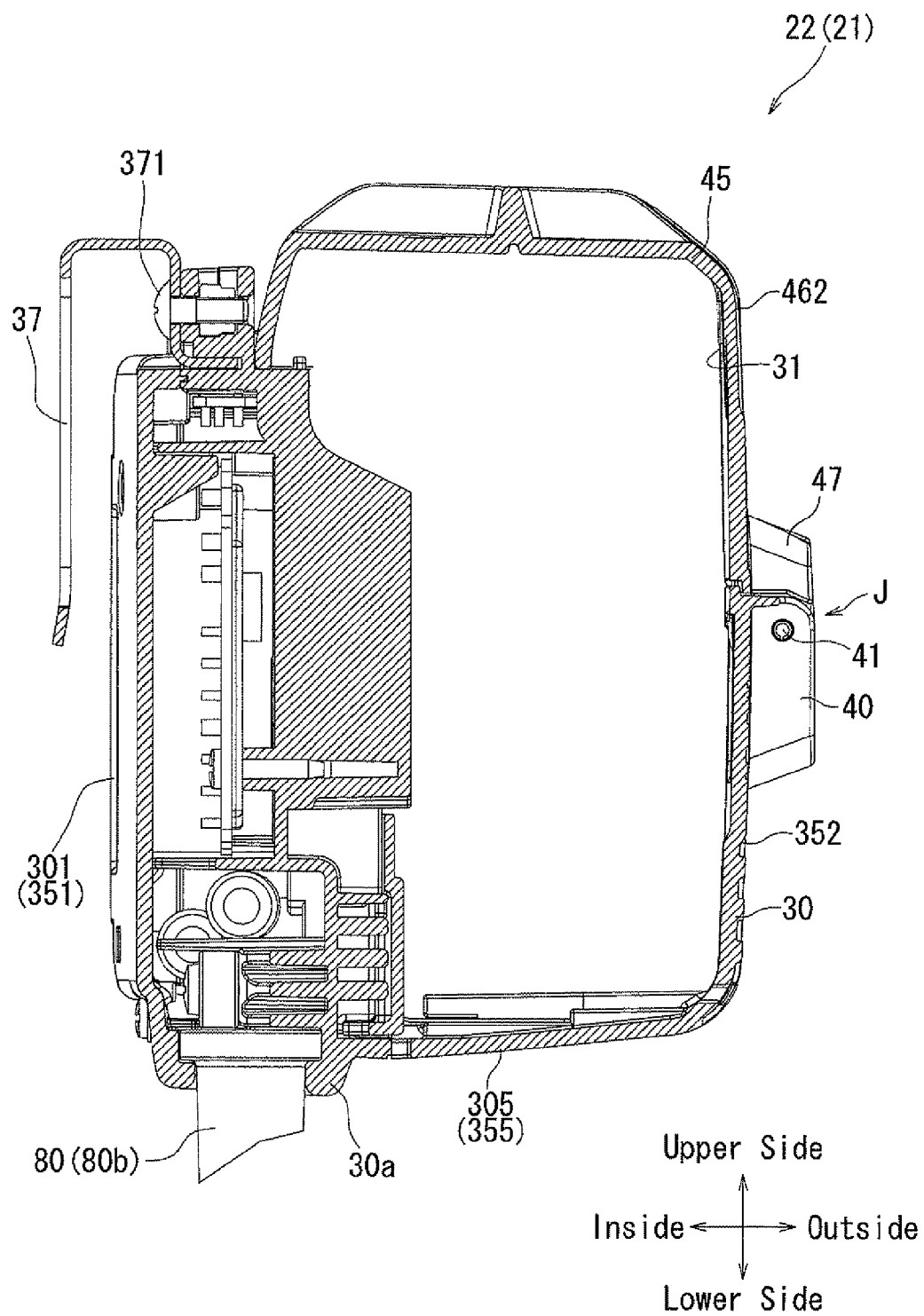
FIG. 9 is a cross-sectional view taken along line IX-IX of FIG. 6.

As shown in FIG. 8, the housing body 30 has an open-topped box shape and is shaped to receive the two batteries B in parallel. In particular, as shown in FIG. 9, the housing body 30 has a battery receiving space 31 that is formed therein, so that the batteries B can be received in the battery receiving space 31 in parallel. As will be recognized, the batteries B can be inserted into the battery receiving space 31 from above.

Figure 7:
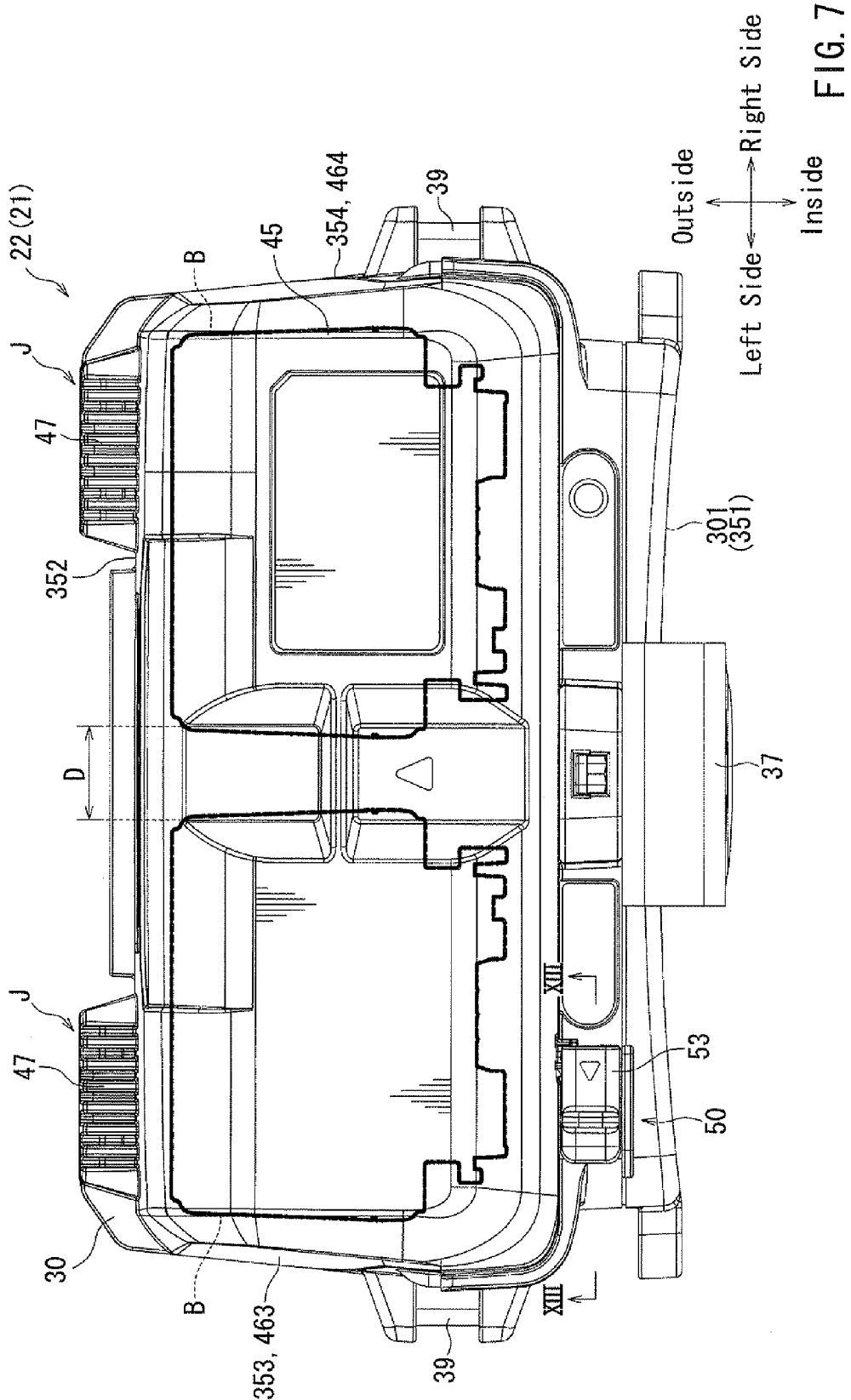
FIG. 7 is a plan view of the battery housing of the battery device.

Further, as shown by the thick broken lines in FIG. 7, the battery receiving space 31 is shaped such that the batteries B can be laterally spaces at a distance (width) D, so that the user P can insert a finger between the batteries B.

Figure 10:
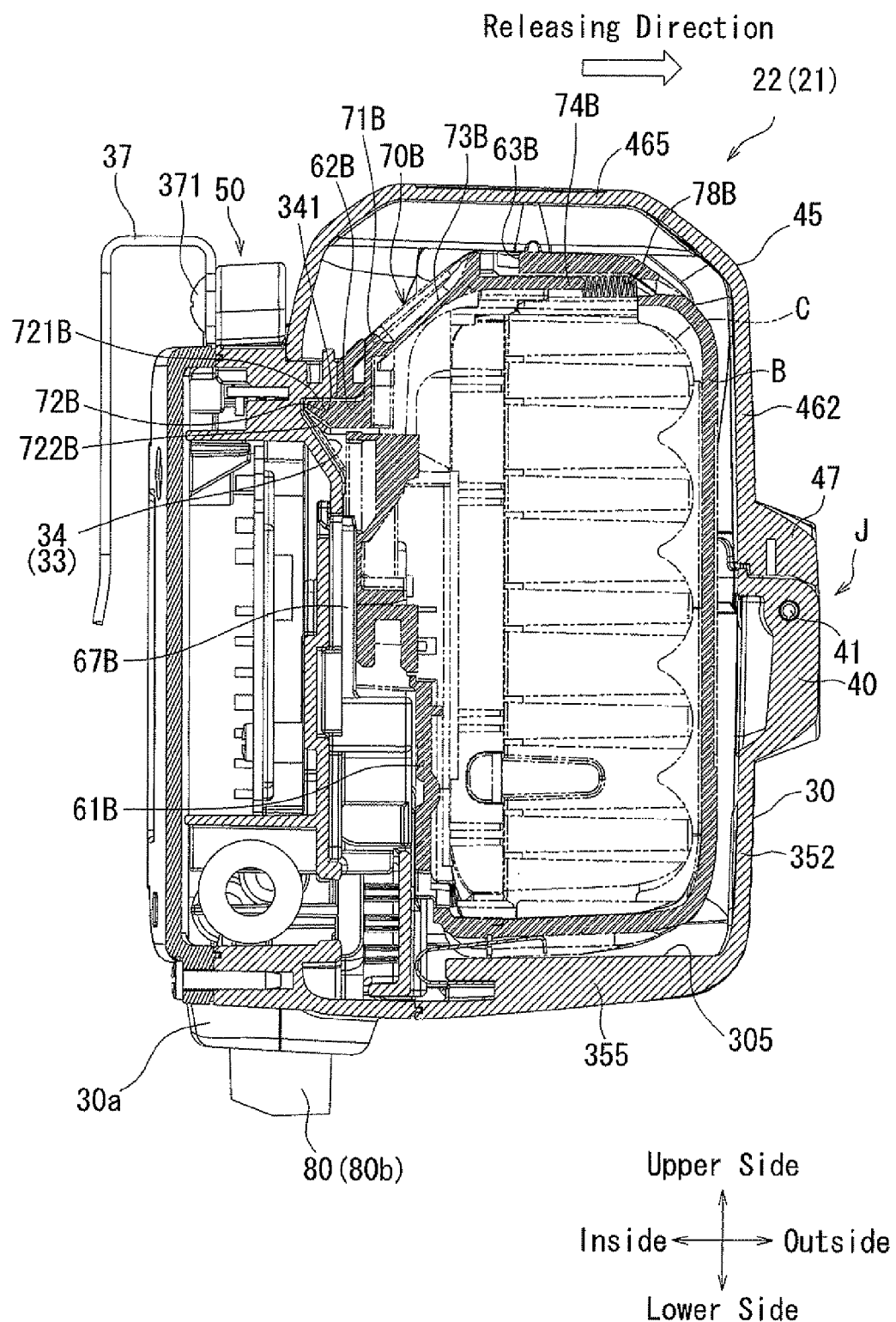
FIG. 10 is a cross-sectional view taken along line X-X of FIG. 6.

As shown in FIG. 10, the battery receiving space 31 is shaped such that each of the batteries B can be receive therein while the connecting side-wall of the housing 61B of each of the batteries B faces an inside wall surface 301 (a body-facing side wall surface) of the housing body 30 and while the engagement release portion 73B of the male hook member 7113 (the through opening 63B of the housing 61B) is upwardly faced (i.e., while a side wall of the housing 61B in which the through opening 63B is not formed faces a bottom or lower wall surface 305 of the housing body 30). That is, the battery receiving space 31 is shaped to receive the batteries B while the male hook mechanism 70B of each of the batteries B is positioned adjacent to an upper portion of the inside wall surface 301 of the housing body 30.

Thus, when the cover member 45 attached to the housing body 30 is opened while the battery housing 22 (the battery main body 21) is attached to the body of the user P, the engagement release portion 7313 of the male hook mechanism 70B of each of the batteries B received in the battery receiving space 31 can be exposed upwardly on an upper side of the housing body 30. Therefore, the use P can easily and quickly manipulate the exposed engagement release portion 73B.

Figure 6:
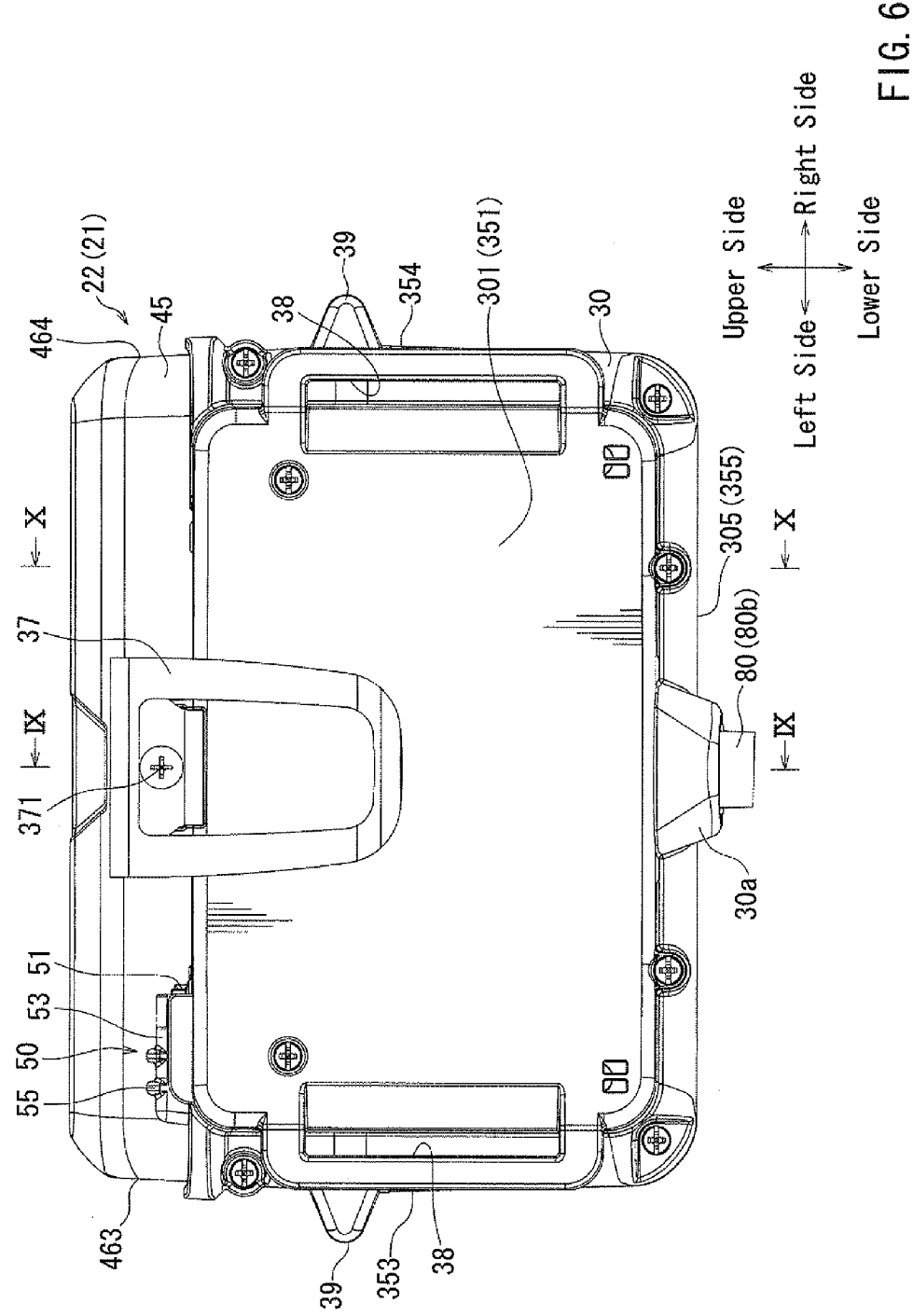
FIG. 6 is a rear elevational view of a battery housing of the battery device, which view is viewed from a body-facing side (an inner side)

Further, as shown in FIG. 9, the housing body 30 includes an inside wall 351 (a body-facing side wall) in which the inside wall surface 301 is formed and an outside wall 352 that is positioned opposite to the inside wall 351. Further, as shown in FIGS. 6 and 7, the housing body 30 includes a left side wall 353 and a right side wall 354 that respectively intersect with the inside wall 351 and the outside wall 352. Further, the housing body 30 includes a bottom or lower wall 355 in which the lower wall surface 305 is formed.

As shown in FIG. 10, the housing body 30 may further include two battery connecting portions each of which has the same structure as the adaptor connecting portion 17 of the tool main body 11. Each of the battery connecting portions has a female hook mechanism 33 that has the same structure of the female hook mechanism (not shown) of the adaptor connecting portion 17. The female hook mechanism 33 is capable of engaging the male hook mechanism 70B of each of the batteries B. The female hook mechanism 33 and the male hook mechanism 7013 may referred to as a male-female engagement device. In particular, the female hook mechanism 33 has a female hook portion 34 which can engage the male hook portion 72B of the male hook member 71B. Further, the female hook portion 34 is positioned to be capable of engaging the male hook portion 72B when each of the batteries B is received in the battery receiving space 31 of the housing body 30. In particular, the female hook portion 34 has a stopper portion 341 that is formed in an upper side surface thereof. The stopper portion 341 is shaped to contact a vertical stopper portion 721B of the male hook portion 72B. When the vertical stopper portion 721B of the male hook portion 72B contacts the stopper portion 341, each of the batteries B including the male hook member 71B can be prevented from moving relative to the battery receiving space 31.

Further, the battery connecting portion has connector terminals (not shown) that have the same structure of the connector terminals of the adaptor connecting portion 17. Conversely, as best shown in FIG. 10, the housing body 30 is connected to a proximal end 80b of the cable 80 via a cable connecting portion 30a. The cable 80 (the proximal end 80b) is electrically connected to the connector terminals of the battery connecting portion of the housing body 30 via an appropriate electric substrate (not shown) that is received in the housing body 30.

When the engagement release portion 73B is manipulated by the user P so as to move the male hook member 71B in a direction shown by an outline arrow in FIG. 10 (rightwardly in FIG. 10) against the spring forces of the biasing springs 78B, the male hook portion 72B can be retracted into the housing 61B through the through hole 62B. Thus, the vertical stopper portion 721B of the male hook portion 72B can be spaced from the stopper portion 341 of the female hook portion 34. As a result, each of the batteries B having the male hook member 71B is allowed to move relative to the battery receiving space 31. Therefore, each of the batteries B can be removed from the housing body 30.

Further, as shown in FIG. 7, the left side wall 353 and the right side wall 354 of the housing body 30 respectively have the same shape and are symmetrically positioned. Further, as shown in FIG. 8, a removed portion 36 is formed in the right side wall 354, the left side wall 353 and the outside wall 352 such that the user P can hold each of the batteries B received in the battery receiving space 31 therethrough when the cover member 45 attached to the housing body 30 is opened. That is, the removed portion 36 is formed in the left side wall 353 and the right side wall 354 that respectively intersect with the inside wall 351 and the outside wall 352 that is positioned opposite to the inside wall 351. Therefore, when the cover member 45 attached to the housing body 30 is opened, each of the batteries B received in the battery receiving space 31 can be partially exposed, so that the user P can hold each of the batteries B through the removed portion 36. As will be appreciated, the removed portion 36 is removed from upper peripheries of the walls 352, 353 and 354 toward the bottom wall 355.

As shown in FIGS. 6 and 7, the housing body 30 has a hook member 37 that is attached to the inside wall 351 thereof. The hook member 37 is attached to the housing body 30 with a screw 371. Therefore, the hook member 37 can be detached from the housing body 30 by loosening the screw 371. As will be appreciated, the hook member 37 is shaped to be hooked on the waist belt S of the user P so as to attach the battery main body 21 to the body of the user P.

Further, as shown in FIG. 6, the housing body 30 has a pair of belt carrier slots 38 into which the waist belt S of the user P can be inserted. The belt carrier slots 38 are separately formed in right and left peripheries of the inside wall 351 so as to be symmetrically positioned. Further, the belt carrier slots 38 may preferably be formed in the inside wall 351 of the housing body 30 when the housing body 30 is molded.

Further, as shown in FIGS. 6 and 7, the housing body 30 has a pair of strap attachment lugs 39 to which a strap (not shown) can be attached. The strap attachment lugs 39 are respectively attached to the left side wall 353 and the right side wall 354 of the housing body 30.

As described above, because the housing body 30 has the hook member 37, the belt carrier slots 38 and the strap attachment lugs 39, the battery main body 21 can be attached to the body of the user P in various ways. Naturally, when the battery main body 21 is attached to the user's body using the belt carrier slots 38 or the strap attachment lugs 39, the hook member 37 can be detached from the housing body 30, if necessary.

As shown in FIG. 7, the inside wall surface 301 (an outer surface of the inside wall 351) has a rounded shape (a concave curved shape) corresponding to a shape of a waist portion of the user P, so as to fit the user's body when the battery main body 21 is attached to the user's body.

Next, the cover member 45 will be described. The cover member 45 has a bottomless box shape and includes an inside wall 466, an outside wall 462, a left side wall 463, a right side wall 464 and a top wall 465. As will be recognized, the outside wall 462, the left side wall 463 and the right side wall 464 of the cover member 45 directly correspond to the outside wall 352, the left side wall 353 and the right side wall 354 of the housing body 30. As shown in FIG. 8, the cover member 45 thus constructed is openably and closably attached to the housing body 30 via hinge connecting portions J. In particular, as shown in FIGS. 8 to 12, the cover member 45 has a pair of outwardly projected hinge members 47. The hinge members 47 are attached to a lower periphery of the outside wall 462 of the cover member 45 while laterally spaced from each other. Conversely, the housing body 30 has a pair of outwardly projected hinge brackets 40. The hinge brackets 40 are attached to an upper periphery of the outside wall 352 of the housing body 30 so as to correspond to the hinge members 47 of the cover member 45. The hinge members 47 of the cover member 45 are respectively rotatably connected to the hinge brackets 40 of the housing body 30 via pivot pins 41. Thus, the cover member 45 is openably and closably attached to the housing body 30. Further, as shown by an outline arrow in FIG. 8, the cover member 45 can be rotated in a direction in which the cover member 45 can be spaced from the user's body when the cover member 45 is opened.

Figure 11:
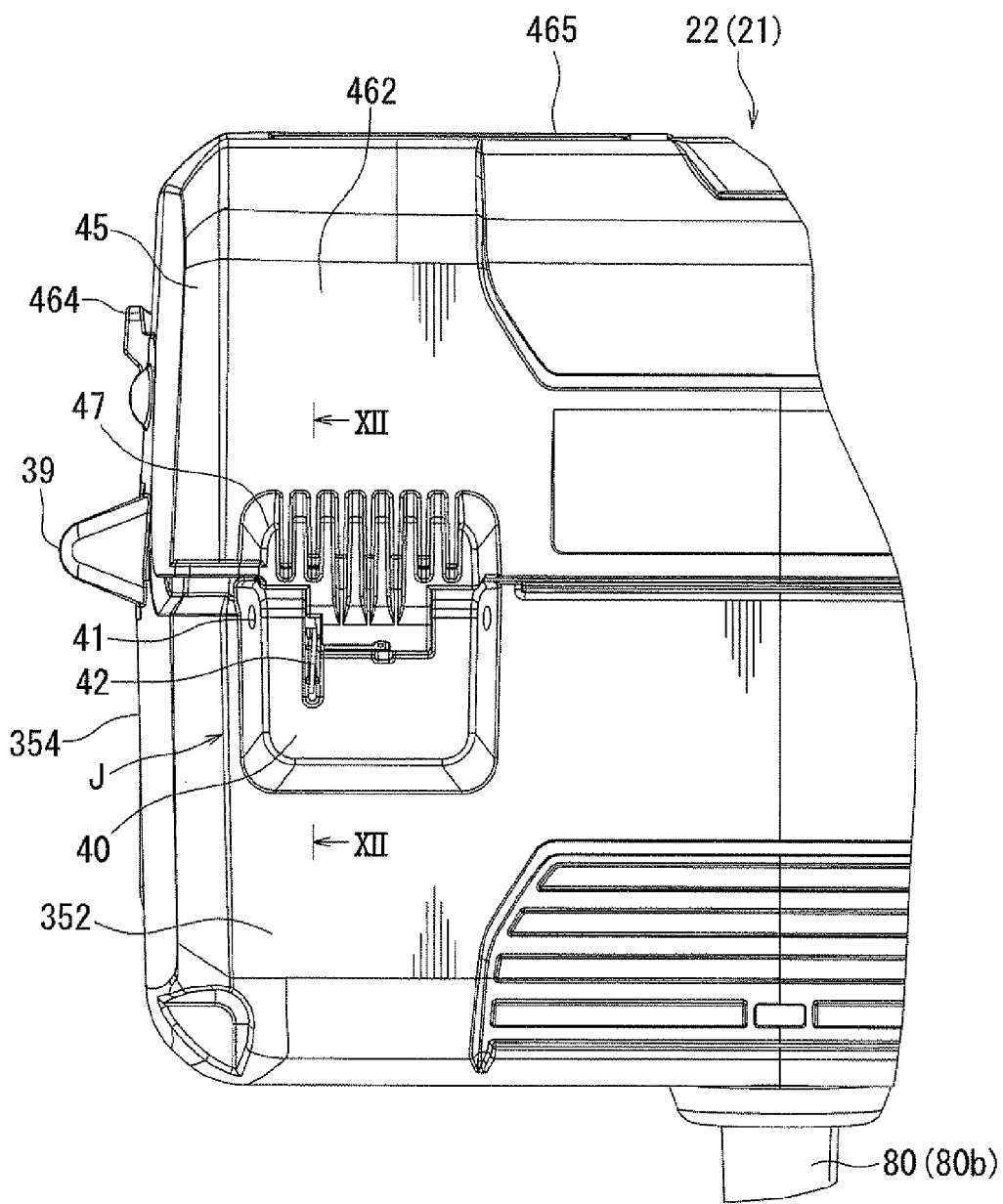
FIG. 11 is an enlarged partially front elevational view of the battery housing of the battery device, which view illustrates that the cover member is hinged to the battery housing.
Figure 12:
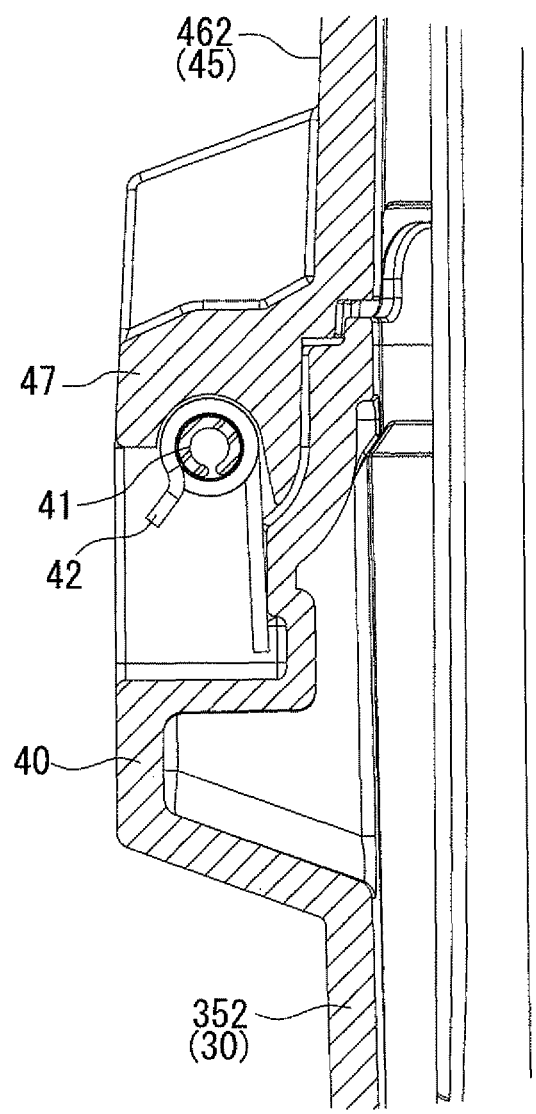
FIG. 12 is an enlarged cross-sectional view taken along line XII-XII of FIG. 11.

As shown in FIGS. 11 and 12, the hinge connecting portions J respectively have coil springs 42 (biasing members). The coil springs 42 are respectively attached to the pivot pins 41. Each of the coil springs 42 is arranged and constructed to bias the cover member 45 in a direction in which the cover member 45 can be closed relative to the housing body 30. Therefore, the cover member 45 can be automatically closed when a user's hand is released from the cover member 45.

Further, as shown in FIG. 8, an extended portion 48 (a covering portion) is formed in the right side wall 464, the left side wall 463 and the outside wall 462 of the cover member 45. The extended portion 48 has a shape substantially corresponding to the removed portion 36 formed in the housing body 30, so as to completely cover the removed portion 36 when the cover member 45 is closed. Therefore, the cover member 45 is capable of reliably closing the battery receiving space 31 of the housing body 30. As a result, the cover member 45 is capable of preventing water (raindrops) and dust from entering the battery receiving space 31.

Further, the battery main body 21 may preferably have a lock mechanism 50 that is capable of releasably locking the cover member 45. When the lock mechanism 50 is in a locking condition, the cover member 45 is locked, so that the cover member 45 can be maintained in a closed condition. To the contrary, when the lock mechanism 50 is in an unlocking condition, the cover member 45 is released or unlocked, so that the cover member 45 can be changed to an openable condition. Further, the lock mechanism 50 is constructed such that the locking and unlocking conditions thereof can be changed by the user P.

Figure 13:
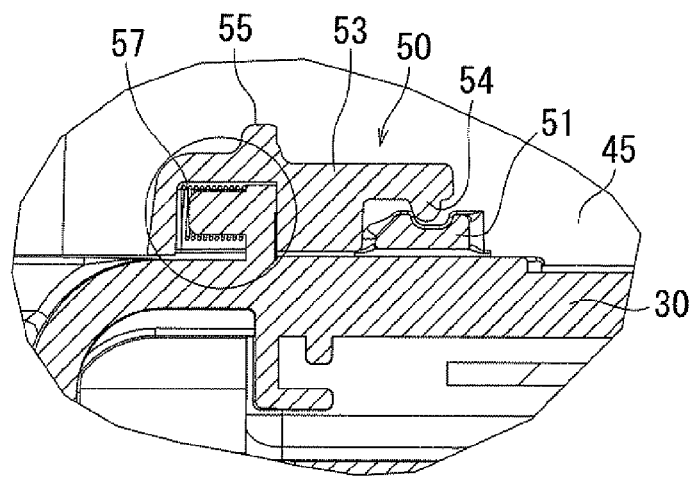
FIG. 13 is a cross-sectional view of a lock mechanism of the cover member, which view illustrates a condition in which it is locked.
Figure 14:
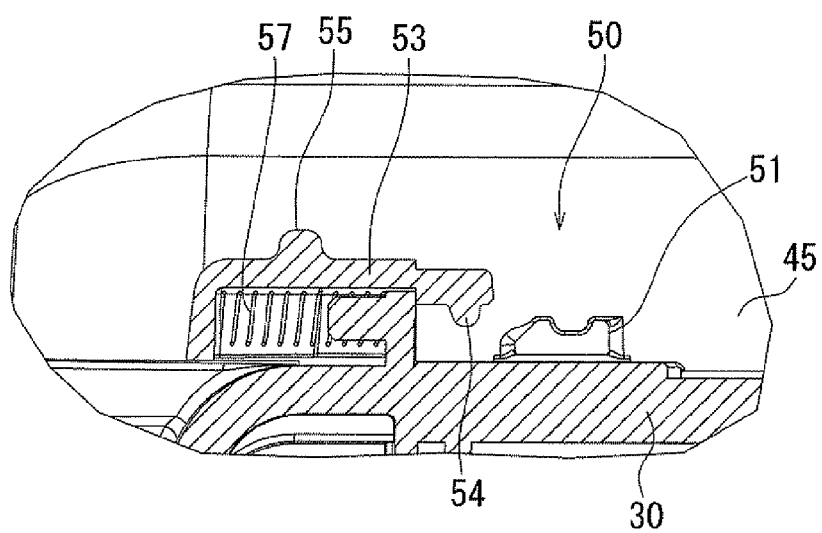
FIG. 14 is a cross-sectional view of the lock mechanism of the cover member, which view illustrates a condition in which it is unlocked.

In particular, the lock mechanism 50 is essentially constructed of a female engagement portion 51, a slider 53 having an engagement male portion 54, and a biasing spring 57 (a coil spring) biasing the slider 53. As shown in FIG. 8, the female engagement portion 51 is integrally formed in the inside wall 466 of the cover member 45 and is positioned adjacent to a lower periphery of the inside wall 466. As shown in FIGS. 13 and 14, the female engagement portion 51 has a recessed portion that is formed in a central portion thereof.

As shown in FIGS. 6 and 7, the slider 53 is laterally slidably attached to the inside wall 351 of the housing body 30 and is positioned on an upper periphery of the inside wall 351. As shown in FIGS. 13 and 14, the slider 53 is arranged and constructed to move or slide toward and away from the female engagement portion 51 of the cover member 45. Further, the slider 53 has a guide rib (not shown) that is formed therein. Therefore, the slider 53 can be smoothly moved or slid. The engagement male portion 54 formed in the slider 53 is arranged and constructed to be engaged with and disengaged from the female engagement portion 51 when the slider 53 is moved or slid transversely. In this embodiment, when the slider 53 is slid rightwardly, the engagement male portion 54 can be engaged with the recessed portion of the female engagement portion 51, so as to be positioned in an engaged condition (FIG. 13). To the contrary, when the slider 53 is slid leftwardly, the engagement male portion 54 can be disengaged from the female engagement portion 51, so as to be positioned in a disengaged condition (FIG. 14).

As shown in FIGS. 13 and 14, the biasing spring 57 is disposed within the slider 53. The biasing spring 57 is arranged and constructed to bias the slider 53 leftwardly (i.e., in a direction in which the engagement male portion 54 is disengaged from the female engagement portion 51). Therefore, when the engagement male portion 54 is not engaged with the female engagement portion 51, due to a biasing force of the biasing spring 57, the slider 53 can be maintained in a condition in which it is separately from the female engagement portion 51 (a condition shown in FIG. 14). This condition corresponds to the unlocking condition of the lock mechanism 50 in which the cover member 45 can be maintained in the openable condition. When the slider 53 is slid toward the female engagement portion 51 against the biasing force of the biasing spring 57, the engagement male portion 54 can be engaged with the female engagement portion 51, so that the slider 53 can be maintained in a condition in which it is joined to the female engagement portion 51 (a condition shown in FIG. 13). This condition corresponds to the locking condition of the lock mechanism 50 in which the cover member 45 can be maintained in the closed condition.

As shown in FIGS. 13 and 14, the slider 53 has a manipulator projection 55 that is projected upwardly therefrom. Therefore, the user P can easily manipulate the slider 53 to slide the same.

According to the battery device 20 thus constructed, because the housing body 30 is constructed to be attached to the body of the user P, the battery device 20 can be attached to the user P. Further, the housing body 30 can be attached to the body of the user P in various ways. As a result, the battery main body 21 can be attached to the user's body in various ways.

Further, the battery housing 22 including the housing body 30 is capable of removably receiving the two batteries B and is capable of being electrically connected to the batteries B via the battery connecting portions formed therein. Therefore, the battery housing 22 (the housing body 30) can receive general-purpose rechargeable batteries.

The battery housing 22 is constructed of the housing body 30 and the cover member 45 that is openably and closably attached to the housing body 30. Therefore, the battery housing 22 can be effectively sealed by the cover member 45, so that water (raindrops) can be prevented from entering the battery housing 22.

Further, when the cover member 45 is opened relative to the housing body 30 while the battery housing 22 (the battery main body 21) is attached to the body of the user P, the engagement release portion 73B can be upwardly faced (i.e., exposed upwardly on the upper side of the housing body 30). Therefore, the use P can easily and quickly manipulate the engagement release portion 7313, so as to disengage the male hook mechanism 7013 from the female hook mechanism 33. Thus, each of the batteries B can be easily and quickly replaced with new ones.

Each of the batteries B can be inserted into the housing body 30 (the battery receiving space 31) from above, i.e., in a direction of gravitational force. Therefore, each of the batteries B can be easily inserted into the housing body 30 by gravity.

Further, the housing body 30 has the removed portion 36. Therefore, the user P can easily hold each of the batteries B received in the battery receiving space 31 through the removed portion 36 when the cover member 45 is opened relative to the housing body 30. Therefore, each of the batteries B can be easily removed from the housing body 30. As a result, each of the batteries B can be easily and quickly replaced with new ones.

The cover member 45 is arranged and constructed to be rotated in the direction in which the cover member 45 can be spaced from the user's body when the cover member 45 is opened while the housing body 30 is attached to the body of the user P. Therefore, the cover member 45 can be fully opened without interfering with the user's body. Therefore, each of the batteries B can be easily and quickly replaced with new ones.

The cover member 45 can be automatically closed due to a biasing force of the coil spring 42 when a user's hand is released from the cover member 45. Therefore, the cover member 45 can be prevented from being left open. As a result, it is possible to reliably prevent water (raindrops) from entering the battery housing 22.

The hook member 37 is constructed to be detached from the housing body 30 by simply loosening the screw 371. Therefore, the hook member 37 can be detached from the housing body 30 when the battery main body 21 is attached to the user's body without using the same. Therefore, the battery main body 21 can be comfortably attached to the body of the user P, for example, when the battery main body 21 is attached to the body of the user P using the strap.

Further, the inside wall surface 301 of the housing body 30 has the rounded shape corresponding to the shape of the waist portion of the user P. Therefore, the battery main body 21 can be comfortably attached to the body of the user P because the inside wall surface 301 can evenly contact the user's body.

The housing body 30 has the belt carrier slots 38 into which the waist belt S of the user P can be inserted. Therefore, the battery main body 21 can be attached to the user's body using the waist belt S of the user P. Further, the housing body 30 has the strap attachment lugs 39 to which the strap is attached. Therefore, the battery main body 21 can be attached to the user's body using a strap.

The battery receiving space 31 is shaped such that the batteries B can be laterally spaces at the width D, so that the user P can insert a finger between the batteries B received therein. Therefore, the user P can separately grasp or hold each of the batteries B. As a result, the user P can easily remove each of the batteries B in order to replace with new ones.

The battery device 20 (the battery main body 21) has the lock mechanism 50. The cover member 45 can be reliably maintained in the closed condition when the lock mechanism 50 is in the locking condition. To the contrary, the cover member 45 can be maintained in the openable condition when the lock mechanism 50 is in the unlocking condition. Further, the locking and unlocking conditions of the lock mechanism 50 can be freely changed by the user P. Therefore, the user P can use the lock mechanism 50 as necessary.

Various changes and modifications may be made to the present invention without departing from the scope of the previously shown and described embodiment. For example, in the embodiment, each of the battery connecting portions of the housing body 30 has the female hook mechanism 33. Conversely, each of the batteries B has the male hook mechanism 70B capable of engaging the female hook mechanism 33. That is, the female hook mechanism 33 and the male hook mechanism 70B are exemplified as the male-female engagement device. However, the male-female engagement device may be various types of structures.

Further, in the embodiment, the engagement release portion 73B can be changed, if necessary. Also, each of the removed portion 36 of the housing body 30 and the extended portion 48 of the cover member 45 can have various shapes.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A battery device that functions as a power source of a tool main body and is attachable to a body of a user, the battery device comprising:
    a battery housing that is capable of removably receiving at least one rechargeable battery and capable of being electrically connected to the at least one battery;
    an adaptor that is capable of being electrically connected to the tool main body; and
    a cable electrically connecting the battery housing and the adaptor,
    wherein the battery housing comprises a housing body that is constructed to be attached to the body of the user and is capable of receiving the at least one battery therein, and a cover member that is openably and closably attached to the housing body,
    wherein the housing body and the at least one battery are connected to each other via a male-female engagement device,
    wherein the male-female engagement device has a male hook mechanism formed in the at least one battery and a female hook mechanism formed in the housing body and having a female hook portion,
    wherein the male hook mechanism is composed of a male hook member and a biasing spring that biases the male hook member toward the female hook portion, and
    wherein the male hook member has an engagement release portion that is positioned so as to be exposed when the cover member is opened relative to the housing body.

2. The battery device as defined in claim 1, wherein the housing body is arranged and constructed such that the at least one battery can be inserted thereinto from above when the housing body is attached to the body of the user, and wherein the engagement release portion is exposed upwardly on an upper side of the housing body when the cover member is opened.

3. The battery device as defined in claim 1, wherein the housing body includes an inside wall that faces the body of the user, an outside wall that is positioned opposite to the inside wall, and side walls that respectively intersect with the inside wall and the outside wall, and wherein a removed portion is formed in the side walls and the outside wall so as to be extended downwardly from upper peripheries thereof, so that the at least one battery received in the housing body can be partially laterally exposed when the cover member is opened.

4. The battery device as defined in claim 1, wherein the cover member is arranged and constructed to be moved in a direction in which the cover member can be spaced from the body of the user when the cover member is opened while the housing body is attached to the body of the user.

5. The battery device as defined in claim 1 further comprising a biasing member, wherein the biasing member is arranged and constructed to bias the cover member in a direction in which the cover member can be closed relative to the housing body.

6. The battery device as defined in claim 1 further comprising a hook member that is shaped to be hooked on the body of the user, wherein the hook member is detachably attached to the housing body.

7. The battery device as defined in claim 1, wherein the inside wall of the housing body has a rounded shape corresponding to a shape of a waist portion of the user.

8. The battery device as defined in claim 1 further comprising a belt carrier slot into which a waist belt of the user can be inserted.

9. The battery device as defined in claim 1 further comprising a strap attachment lug to which a strap can be attached.

10. The battery device as defined in claim 1, wherein the housing body is shaped to receive two rechargeable batteries in parallel, and wherein the housing body is shaped such that the rechargeable batteries can be laterally spaces at a distance, so that the user can insert a finger therebetween.

11. The battery device as defined in claim 1 further comprising a lock mechanism that is capable of maintaining a closed condition of the cover member relative to the housing body.

12. The battery device as defined in claim 11, wherein the lock mechanism is constructed to be changed between a locking condition in which the cover member can be maintained in the closed condition and an unlocking condition in which the cover member can be maintained in an openable condition.

13. A battery device that functions as a power source of a tool main body and is attachable to a body of a user, the battery device comprising:
    a battery housing capable of removably receiving a rechargeable battery and having a battery connecting portion formed therein,
    an adaptor having a connector mechanism, and
    a cable electrically connecting the battery housing and the adaptor,
    wherein the battery connecting portion of the battery housing is arranged and constructed to be electrically and mechanically connected to a connector mechanism of the battery,
    wherein the connector mechanism of the adaptor is arranged and constructed to be electrically and mechanically connected to an adaptor connecting portion formed in the tool main body,
    wherein the battery connecting portion of the battery housing has the same structure as the adaptor connecting portion of the tool main body, and wherein the connector mechanism of the adaptor has the same structure as the connector mechanism of the battery.

14. The battery device as defined in claim 13, wherein the battery connecting portion has a female hook mechanism that is capable of engaging a male hook mechanism of the battery.

* * * * *